G. E. PORTER.
HEATING REGULATION.
APPLICATION FILED JULY 8, 1913.
1,122,419.
Patented Dec. 29, 1914.
2 SHEETS—SHEET 1.
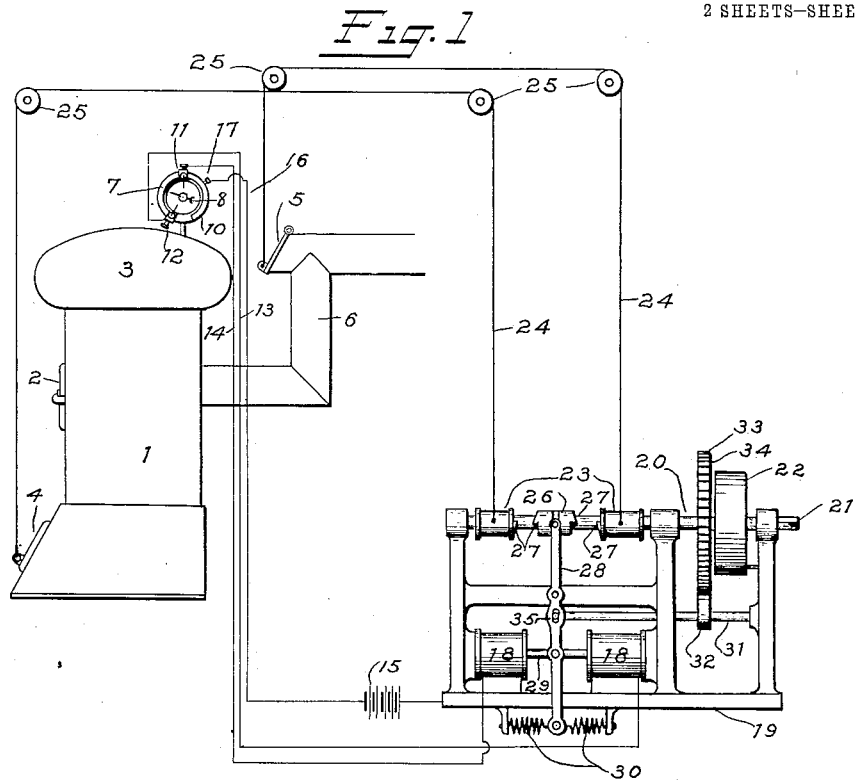
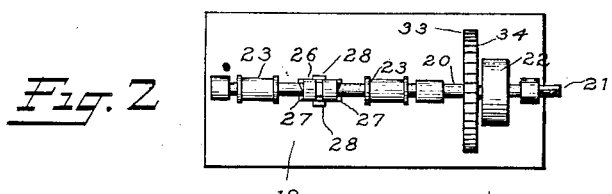
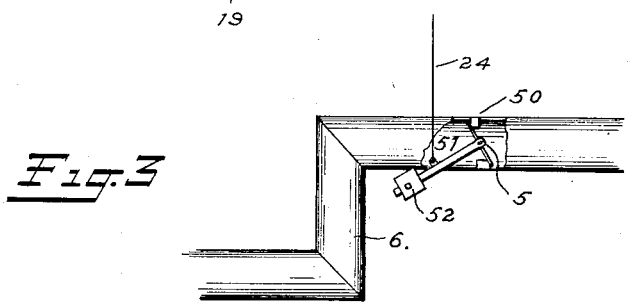
WITNESSES:
Gustav Rasmus
Michael Jannone
INVENTOR
Guy E. Porter
BY
William F. Nickel.
ATTORNEY G. E. PORTER.
HEATING REGULATION.
APPLICATION FILED JULY 8, 1913.
1,122,419.
Patented Dec. 29, 1914.
2 SHEETS—SHEET 2.
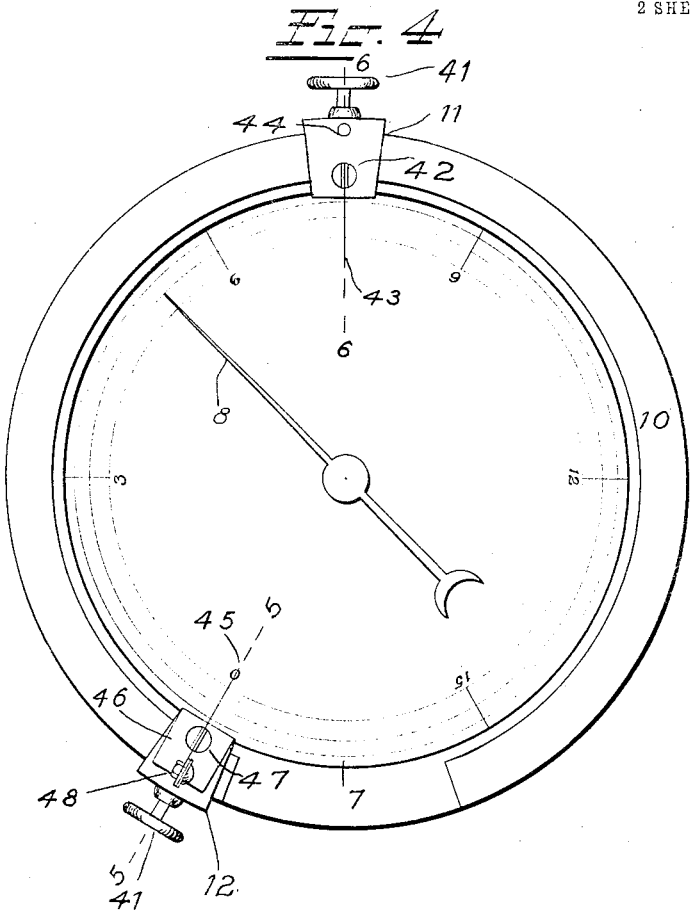
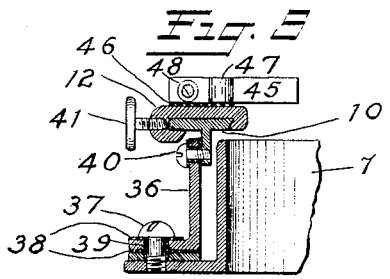
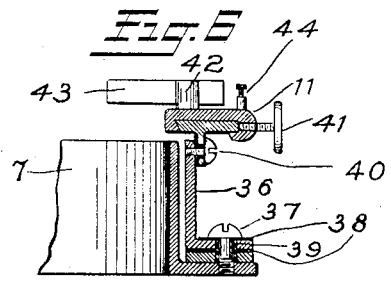
WITNESSES:
Gustav Rasmus
Michael Iannone
INVENTOR
Guy E. Porter
BY
William F. Nickel.
ATTORNEY

UNITED STATES PATENT OFFICE.

GUY ELBERT PORTER, OF BUFFALO, NEW YORK.

HEATING REGULATION.

1,122,419.   Specification of Letters Patent.   Patented Dec. 29, 1914.

Application filed July 8, 1913. Serial No. 777,821.

*To all whom it may concern:*

Be it known that I, GUY E. PORTER, a citizen of the United States, and a resident of Buffalo, in the county of Erie and State of New York, have invented certain new and useful Improvements in Heating Regulation, of which the following is a specification.

My invention relates to heating systems of the type wherein a boiler is employed to supply steam to the radiators and other heating devices in the rooms and apartments of buildings; and the primary object thereof is to provide means for automatically regulating the pressure of steam in the boiler so as to prevent the same from falling below a predetermined minimum or rising above a predetermined maximum.

A further object of my invention is to provide a construction capable of adjusting the limits within which such regulation may be effected, in order that the operation of my invention may at all times be controlled and suited to the needs of the individual user or the circumstances and conditions that may be encountered in any individual case.

These and other objects of my invention I attain by an arrangement of parts which open and close the drafts of the furnace by which the boiler is heated; the said parts being electrically controlled and caused to operate when the boiler pressure is too high or too low, to give the desired result. This mode of operation is secured by mounting a pressure indicator on the boiler, and electric contacts in proximity thereto; these contacts forming parts of circuits which are adapted to be closed by the pointer of the indicator, in order that the controlling devices may be energized and the above parts actuated as required.

Referring to the drawings accompanying this specification; which illustrate a preferred form of my invention and upon which the same reference characters indicate the same parts throughout the several views: Figure 1 is a diagrammatic view showing the general arrangement of parts constituting my invention; Fig. 2 is a top plan of a part of my invention which directly actuates the dampers of the furnace; Fig. 3 is a detail view showing a slight modification; Fig. 4 is a front elevation of the pressure regulator which is mounted on the boiler and the contacts carried thereby to be engaged by the pointer to produce automatic regulation; Fig. 5 is a detail sectional view taken substantially on the line 5—5 of Fig. 4; and Fig. 6 is another detail sectional view taken substantially on the line 6—6 of Fig. 4.

In order to describe my invention fully and particularly I shall refer first to Fig. 1, showing my invention in outline. The numeral 1 indicates a boiler and furnace, having a coal door 2, a top 3, and a draft opening at the bottom closed by a door or cover 4. When this door is open the air flows into the furnace freely, as will be readily understood. The furnace also has a damper 5 in a smokepipe 6, this damper by-passing the air around the furnace when open, and causing the air to flow through the furnace to the pipe 6 and the chimney when closed. These parts are well known and form no part of my invention. The pressure indicator mounted on the boiler is shown at 7; this indicator may be a Bourdon gage, or any other suitable pressure indicator, having a pointer 8 which moves over the face of the dial and makes known the amount of boiler pressure by the numbers on the face of the indicator in the well known way. It is essential that this pointer be in metallic contact with the body or casing of the indicator, since the pointer forms part of an electric circuit, as will appear later. The casing of the indicator carries a curved support or guide rail 10; and on this guide rail are slidably mounted for purposes of adjustment plates 11 and 12. Two of these plates are provided, and each carries a contact which projects into the path of the pointer and will be engaged thereby when the pointer reaches a certain position, depending on the pressure; and these contacts are placed in circuit with the controlling devices for the operating means which lift the door 4 and damper 5. The contact carried on the plate 12 is joined to a wire 13, and the other contact is joined to a wire 14, these wires forming part of the path for current from a battery or other electrical source 15. The two wires mentioned lead through the controlling devices for the door 4 and damper 5, and the other terminal of the battery 15 is grounded, as by connecting it to a binding post on the casing 7. The ground wire is shown at 16, and two or more such binding posts 17 may be provided on the indicator to afford a convenient connection.

The controlling devices for the operating means which opens the door 4 and damper 5 comprise a pair of solenoids 18 mounted in a frame 19. This frame carries a shaft 20 having a squared end 21 to enable it to be utilized to wind up a motor spring 22. The spring 22 turns the shaft 20, and loosely mounted on this shaft are two winding drums 23. Each of these has a cord joined to it and made fast, and one of these cords lead to the door 4 and the other to the damper 5. Suitable guide pulleys are employed to hold these cords 24 in proper position, as shown at 25. In order to cause the drums 23 to wind up either of the cords or chains 24 I key to slide on the shaft 20 a clutch 26. This clutch has projections 27 from its opposite ends which engage similar projections 27 on the adjacent ends of the drums. When the clutch is in central position it will not engage either drum, as will be perceived. It is held in central position by a lever 28, connected by a pivot bolt to the core 29 of the solenoids 18, the lower end of the lever being engaged by oppositely acting springs secured to lugs on the bottom of the frame 19, to hold the lever midway between them. When one solenoid is active it draws the core 29 into it, and moves the lever 28 and clutch 26 one way. When the other solenoid 18 is made active, the clutch moves the other way.

I wish to state here that this type of actuating and controlling apparatus or motor for drawing the cords 24 and opening the air door 4 and the damper 5 is not the only form of spring motor which may be employed to accomplish my purpose, and I of course do not wish to be limited thereto. For example I may employ instead of the motor shown and just described a well known form of spring motor which has arms instead of winding drums connected to the cords 24, and which is now used in heating systems of many well known makes. In short any device that will wind up the cords 24 or pull upon them to a sufficient extent to open the door 4 or damper 5 will answer my purpose.

The above mentioned oppositely acting springs are indicated at 30; and I pivotally connect the lever 28 to a brake bar 31. It will be understood that the lever has a yoke at its upper end, and that this yoke has projections which are received in a groove in the clutch 26, so that the clutch can move along the shaft 20 and at the same time be free to rotate with it. The brake bar 31 has a spring pawl 32 at its outer end, and this pawl engages teeth 33 on the disk 34 fixed on the shaft 20. This pawl will hold the disk and shaft 20 against rotation only when the lever 28 is in central position. When the lever moves either way, the pawl releases the disk, and the spring 22 turns the shaft. One end of the spring will of course be fixed to the frame 19, and the other to the shaft 20. The bar 31 is pivoted to the lever 28 by a bolt or pin and the lever is pivoted to the frame 19 by a bolt or pin 35.

From the above description it will be apparent that, supposing the contacts on the plates 11 and 12 are insulated from each other, one of the cords 24 will be taken up whenever the pointer 8 touches a contact. If the pressure rises too high, the circuit will be completed through the left hand solenoid 18 and the result will be to move the clutch 26 to the right and turn the right hand winding drum 23. This will pull the cord or chain 24 and open the damper 5, by-passing the air around the furnace. Further, at this time the drum at the left will be released and the door 4 will be closed by its own weight. Therefore the fire in the furnace will not have sufficient draft and will sink causing the boiler pressure to fall. If the pressure be too low the circuit of the right hand solenoid will be completed, and as a result the clutch 26 will move to the left and cause the door 4 to be lifted, damper 5 now being closed. This opens the airdraft in the furnace, the fire burns faster and evolves more heat, and the boiler pressure again rises. I mount angle pieces 36 on the casing 7 by means of screws 37, insulating washers 38 and an insulating sleeve 39. This method prevents electrical contact between the rail and the indicator, as the rail is held on the indicator by means of these pieces. The rail is bolted to them, and the fastening bolts 40 may be insulated the same as the bolts 37. As many angle pieces as are necessary may be used.

The plates 11 and 12 are made to encircle the rail 10 so that they cannot fall off, and they are held in any position of adjustment by means of binding screws 41. The plate 11 has a lug 42, which may be integral, and to this lug is fastened a contact strip 43. Both the plate and the strip will of course be of metal; and the plate will also carry a binding post 44. The other plate 12 will carry a piece of insulation 46, fastened to it in any suitable way, and this insulation will have a lug 47 supporting a contact 45. This contact 45 will carry a binding post 48, so that the wire 13 may be joined to it. The contacts 43 and 45 are thus perfectly insulated from each other. I may also use my invention on furnaces having a damper other than a by-pass damper. Such a damper is shown at 5' on Fig. 3, mounted inside the pipe 6, and engaging stops 50 when in closed position. This form of damper will normally be held open by a weight 52 on an arm 51. This arm is connected to a cord or chain 24. When this cord or chain is pulled on account of the boiler pressure rising too high the damper 5' will be closed.

My invention is well adapted to control steam heating systems by regulating the boiler pressure in the manner above described, and the limits within which the pressure will be allowed to fluctuate will be fixed by moving the plates 11 and 12 around on the rail 10. The regulation may be confined within a couple of pounds of pressure if desired. The construction is efficient and cheap, and especially well adapted for domestic steam heating and high pressure work.

As stated above, any suitable form of motor may be utilized to be controlled by the battery and the solenoids; and I by no means restrict myself to the one illustrated, although I may employ this one in certain cases. The contact blades on the plates 11 and 12 can be shifted at will, and even an unskilled domestic can attend to a steam boiler furnace having my invention applied thereto. I may make the casing 7 of special construction to receive the rail 10 and the plates 11 and 12; or I may adapt ordinary makes of pressure gages to my purpose by cutting away part of the front or otherwise altering the same to enable the rail and plates to be fitted to it.

It will of course be understood that the door 4 and damper 5 drop by their own weight as soon as the corresponding drum or spool 23 is released by the clutch 26. If desired, suitable stops may be mounted on the frame 19 to limit the degree of movement of the drums 23, and prevent the door and damper from being opened too far, or being thrown beyond the upper dead center, which would cause them to remain in open position; and such stops can of course be made adjustable. If preferred the stops can be located so as to engage the door and damper instead. I can also use my invention on closed hot-water heating systems where generators of any description are employed, for the purpose of maintaining and regulating the pressure of the system.

The above description and accompanying drawings are of course illustrative only, setting forth but one embodiment of my invention and the method whereby the same can be applied. I wish to reserve to myself the right to make such changes in the shape, size and arrangement of the parts as fairly fall within the scope and spirit of my regulating arrangement and are necessary or desirable to carry out the same in practice.

Having described my invention, what I claim as new and desire to secure and protect by Letters Patent of the United States is:—

1. The combination of an indicator having a pointer, a rail mounted on the indicator, means for insulating the rail from the body of the indicator, and a pair of relatively adjustable members carried by the rail and each bearing a contact, said contacts being insulated from each other and projecting into the path of the pointer.

2. The combination of an indicator having a movable pointer, angle pieces on the indicator, a guide rail secured to the angle pieces in insulated relation with the body of the indicator, relatively adjustable members slidably mounted on the rail and adapted to be secured in any position thereon, and a contact secured to each of said members and extending into the path of the pointer, said contacts being insulated from each other.

3. The combination of an indicator having a movable pointer, angle pieces on the indicator, a guide rail mounted on the angle pieces in insulated relation with the body of the indicator, relatively adjustable members slidably mounted on the rail and adapted to be secured in any position thereon, a contact mounted on each member and extending into the path of the pointer, one of said members having a binding post and being electrically connected with the contact thereon, the other member having an insulating body supporting the contact thereon, and means for joining an electric conductor to the last-named contact.

4. The combination of an indicator having a movable pointer, angle pieces on the indicator projecting forward and insulated from the body of the indicator, a guide rail insulatably secured to the angle pieces, relatively adjustable members slidably mounted on the rail and adapted to be secured in any position thereon, and a contact secured to each of said members and extending into the path of the pointer, said contacts being insulated from each other.

5. The combination of an indicator having a movable pointer, angle pieces on the indicator projecting forward and insulated from the body of the indicator, a guide rail insulatably secured to the angle pieces, relatively adjustable members slidably mounted on the rail and adapted to be secured in any position thereon, a contact mounted on each member and extending into the path of the pointer, one of said members having a binding post and being electrically connected to the contact thereon, the other member having an insulating body supporting the contact thereon, and means for joining an electric conductor to the last named contact.

Signed at Oswego in the county of Oswego and State of N. Y. this 2nd day of July A. D. 1913.

GUY ELBERT PORTER.

Witnesses:
 GEO. B. FAYETTE,
 BRUCE H. BRUM.